Figure 4:
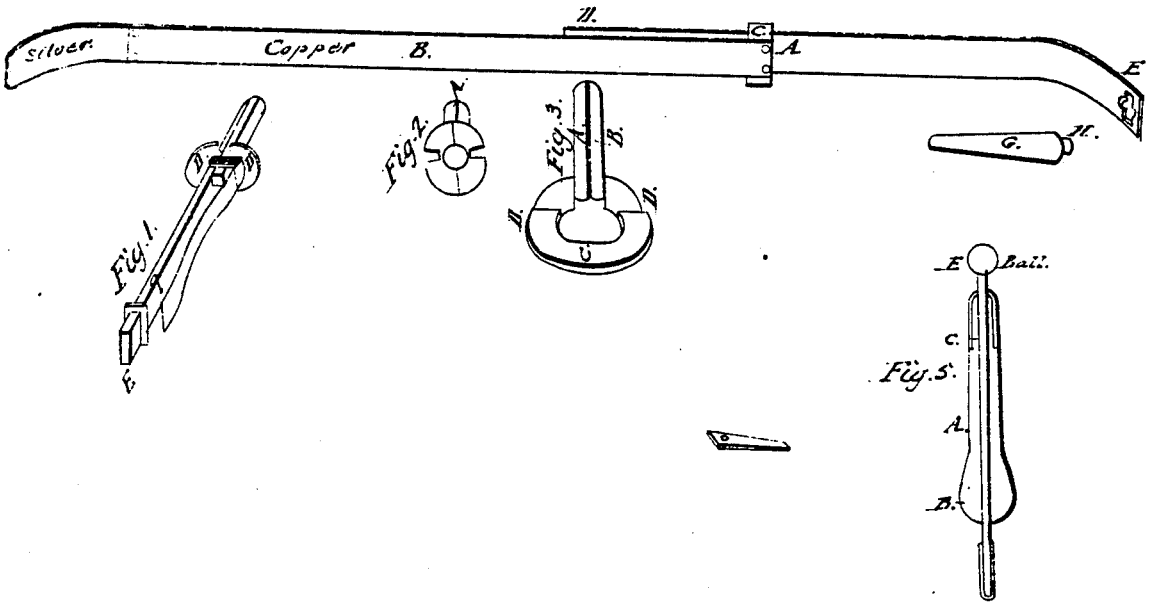

D. Harrington,

Battery.

No 7,982 X

Patented Jan. 27, 1834.

BEST AVAILABLE COPY

N. PETERS, PHOTO-LITHOGRAPHER, WASHINGTON, D. C.

BEST AVAILABLE COPY

UNITED STATES PATENT OFFICE.

DANIEL HARRINGTON, OF PHILADELPHIA, PENNSYLVANIA.

APPARATUS FOR THE CURE OF CERTAIN DISEASES BY ELECTRICITY.

Specification forming part of Letters Patent dated January 27, 1834. 7,982 X.

*To all whom it may concern:*

Be it known that I, DANIEL HARRINGTON, of the city of Philadelphia, in the State of Pennsylvania, did on the 22d day of July, in the year 1833, obtain Letters Patent of the United States for a new and useful instrument or apparatus for the purpose of applying the galvanic, electric, or magnetic fluid or influence, as produced by the contact of different metals, to the cure of certain diseases in the human system, and that I have now invented other instruments or apparatus intended to apply the same power or influence to the same as well as to the other parts of the human body, and to the removal of the same diseases to which the first-named instrument was to be applied, as well as to various others to which from its construction it was not adapted; and I do hereby declare that the following is a full and exact description of my said improvements.

Figure 1 in the accompanying drawings represents the instrument for which I have already obtained a patent, and a general description of which is introduced here for the purpose of showing the way in which I append other parts or pieces thereto with the design of increasing its action.

A and B are two pieces of metal, one of silver and the other of zinc, having between them a strip of ivory or other bad conductors, C, to keep them separate from each other.

D D are flanges or collars; E, the ends of the two pieces of metal, which may be brought into contact with each other by slight pressure, and F the rounded end which is to be inserted in one of the cavities of the system.

For a more particular description of this instrument, the mode of applying it, I refer to the specification appended to the Letters Patent obtained therefor. I will here observe, however, that instead of depending upon the elasticity of one or both of the pieces A and B to bring their ends E into contact, I sometimes make one of them to work as upon a hinge at or near to the inner end of the non-conducting piece C. This may be effected in various ways, as by two pins, *a a*, which may pass through the piece of metal, being firmly attached thereto, while their inner ends play freely in holes made to receive them in the non-conducting piece.

A silk or other non-conducting thread, bound round near and in front of the flanges, will have sufficient elasticity to admit of the requisite play, and the end F of the metal thus alternately opening and closing will in some cases act more advantageously than the immovable metal—as, for example, upon a stricture. A screw, *b*, may be employed to pass through the metal and partially through the non-conductor when it is desired to render this end immovable.

To increase the action and size of this apparatus I make cases of thin silver and zinc combined, which I slide into the rounded end F, and which serves to cover it from the point to the flange. The silver and zinc forming these cases are sometimes united to each other lengthwise by soldering, as is shown in Fig. 2. The lines of junction cross the flange and run along the case to its end A, the manner in which the two metals are joined being distinctly shown in the drawings. This kind of case of ferrule may be made either with or without the flange, and it may be applied to use by itself without the part, Fig. 1, to which it is intended in general to append it.

I make other cases for increasing still further the action and size of the apparatus, in which the two longitudinal silver and zinc halves are not in contact with each other, but stand at some diatance apart—say one sixteenth of an inch, more or less—for their whole length. These two halves are kept in their places and separate from each other by a stiff connecting-bow of metal, which may be made somewhat in the form of a horseshoe. This is to be soldered by its two ends to the interior ends of the two halves which form the divided case or ferrule. One of this description is shown in Fig. 3, where the two pieces A and B are one of silver and the other of zinc, the dark lines between them representing the space by which they are separated from each other. C is the bow of metal, soldered by its ends to the pieces A and B. It is to be bent at right angles or otherwise turned or curved at D D, so that, while it retains the pieces A B in their places, the case may be slipped over the end F of Fig. 1, or over the ferrule, Fig. 2, so that the three may operate conjointly. Besides the change or modification produced in the action of the first patented instrument, by these ad- 7,982X

BEST AVAILABLE COPY ditions, there is also included a change of size, adapting them from this cause to the use of subjects of different ages and conditions.

Another form or modification of this apparatus is represented in Fig. 4 in the accompanying drawings, and which is intended to be used when it is desired to cause the galvanic influence to pass along the whole cavity of the body and to act upon the viscera in general. A and B are two strips of metal, the latter being in general made of copper and the former of zinc, and thereby sliding through mortises in a piece of ivory or other non-conducting substance. C can be lengthened or shortened, as may be necessary, or the non-conducting substance C may be riveted to one of the strips and the other slide in it, while they are thereby kept apart so as to operate in the same manner as the two ends E in Fig. 1. Thus the end D of the piece A may by pressure be brought into contact with the piece B or made to recede from it at pleasure.

The end E of the piece B is of silver, and is intended to be held in the mouth, while to the other end of the instrument there is affixed a piece of zinc similar in form to the rounded end of E of the apparatus, Fig. 1. Such a piece is represented at G, having a piece or tenon at its end H, which will pass through the mortise F in the piece A, where it is to be fastened by means of a wedge. The instrument, Fig. 1, may in fact be employed for this purpose by so affixing it to the end of A that the part F may be used instead of the piece G, or either or all of the before-described cases may be employed in all instances. However, the piece used must be of such size as will adapt it to the orifice which it is designed to enter.

The strips A and B may be of any convenient width and thickness, and they are to be curved, as shown in the drawings, which curvature may be readily altered when requisite to adapt it to its intended use. When the silver end E is taken into the mouth and the end G inserted in the proper orifice, an interrupted action may be obtained by causing the end D alternately to touch and to recede from A; or if a continuous current of the electric fluid is to be made to pass through the body, the two pieces may be kept in contact with each other for any length of time.

It is sometimes desirable to pass the galvanic influence otherwise than through the medium of the orifices of the body—as, for example, along the spine. This has been sometimes done by the application of plates of silver and zinc to surfaces whence the cuticle had been removed by means of blistering or otherwise, the plates of silver and zinc having been connected with each other by a wire of silver or other metal. I have, however, devised a method of enabling the galvanic fluid to overcome the resistance to its passage presented by the dry cuticle without the necessity of its removal. For this purpose I take flat plates of silver and of zinc, and form projecting points on one face of each by making grooves thereon which cross each other. This may be effected by means of a three-square file or any other way which will produce points or projections on the surface such that when bound upon the skin will excite without perforating it. Two such plates confined on at the desired parts of the body are to be connected together in the manner of the silver and zinc in the apparatus, Fig. 4, last described, or in any other way adapted to the circumstances of the case, but acting upon the same principle.

Another form in which I make the apparatus is represented in Fig. 5. A is a piece of ivory, bone, or other conducting substance, which is to be formed into a tube and may be about half an inch in diameter for about three or four inches of its length toward the end C. The end B is best formed with a swell or bulb about one inch in diameter. The end C is covered with a zinc ferrule or case for about one inch in length, and this is rounded at its termination to enable it readily to enter the proper cavity of the body. To the opening of the tube A is adapted a whalebone rod, D, which may be about one-fourth of an inch or two in diameter, and an inch longer than the tube A, and it must slide readily through it. To one end of this rod is attached a silver ball, E, which may be of the same diameter with the tube. The opposite end of the rod is covered with a case for about one inch of its length, which case is made of silver and zinc joined together longitudinally and rounded at its ends for entering a cavity of the system as well as for passing through the opening of the tube; or this last-described end of the rod may have a strip of silver on one of its sides and a strip of zinc on the opposite side, the two strips of metal being riveted on by rivets passing through the whole and being in contact at the ends of the rod, but not so longitudinally. When this modification of the apparatus is used in its united form and with the silver ball forward and in contact with the zinc end C, it is to be pressed into the cavity, as above described, until it reaches the diseased part, and then by holding the bulb B in one hand and the small end of the rod in the other, the silver ball will, by a slight pressure on the rod, be moved from its contact with the zinc, and thus by alternately breaking and restoring the contact a succession of impulses will be given to the electric fluid.

In some cases the small end of the rod is to be passed into the orifice by reversing it so that the silver ball will be outward. When this end reaches the membrane of the cavity it will galvanize, and by retracting it within the tube it will cease to do so. If the small end of the rod be inserted above, it will produce a slight but continuous galvanic action.

All the modifications of the apparatus which I have described are such as I have actually essayed, and I have adduced them as exem- 7,982 X plifications of the principle upon which I proceed, under which an indefinite number of other modifications may be made, according to the circumstances of the case and the fancy of the operator, while similar effects will be produced by analogous means.

I intend in some cases, and where a very general action may be desirable, to connect several or the whole of the foregoing instruments by means of a fine silver or other wire in such a manner as will be understood by those acquainted with the conducting-power of metals and the action of galvanic arrangements, and in this way to produce more powerful effects than by either of them singly.

I am aware, as I have herein indicated, that the galvanic influence has been applied to the human system in a manner which might at first view appear to be the same with or anologous to some of the methods which I have described—as, for example, two different metals placed in the mouth loose and unconnected with each other, say one upon and the other under the tongue, and contact produced at their front edges by means of the hands; also, a small cylinder of zinc has been inserted in the rectum and a plate of silver placed in the mouth, the two ends being connected together by a flexible silver wire, so that they might remain in their respective places while the patient was at rest. In some instances, also, a plate of silver and a plate of zinc have been bound up in different parts of the body after the removal of the cuticle, these plates being connected by a flexible wire. Such an apparatus has been worn continuously, and the parts of the body intermediate between the plates have been thus subjected to uninterrupted galvanic action or to one of many hours duration. I do not therefore claim an arrangement of this kind excepting when metallic plates with asperities on thin surfaces are substituted for the plain ones used over abraded parts. With this exception, the instruments which I use are capable of being so arranged as to produce a succession of slight shocks by the intermitting contact of the metals.

What I do claim, therefore, as my invention, in addition to the plates with projecting points on their surfaces, is—

The construction and application of galvanic instruments to the cure of certain diseases, which instruments are capable, under some of their arrangements, of an intermitting action, whether such instruments be made in the form hereinbefore set forth or in any other acting upon the same principle and producing a similar effect.

It was said above of the part shown in Fig. 2 that it may be applied to use by itself. The same may be said of the part shown in Fig. 3. It can be used by itself; and these I claim as my invention, notwithstanding they produce uninterrupted action when used separately; nor can these two be made to intermit their action, whether they be applied conjointly or separately.

Before concluding this specification I will add that I adapt the instruments above described, in one or other of their forms or modifications, to all of the external orifices of the human body, and likewise to the navel, and, in addition to the spine, to any other part or parts of the surface of the same.

DANIEL HARRINGTON.

Witnesses:

VALENTINE KENT,

JAMES GRAHAM.